US009269469B2

(12) United States Patent
Suft

(10) Patent No.: US 9,269,469 B2
(45) Date of Patent: Feb. 23, 2016

(54) ARRANGEMENT AND METHOD FOR INVERSE X-RAY PHASE CONTRAST IMAGING

(71) Applicant: Gabriele Suft, Nürnberg (DE)

(72) Inventor: Gabriele Suft, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 234 days.

(21) Appl. No.: 13/959,527

(22) Filed: Aug. 5, 2013

(65) Prior Publication Data

US 2014/0037059 A1 Feb. 6, 2014

(30) Foreign Application Priority Data

Aug. 6, 2012 (DE) .......................... 10 2012 213876

(51) Int. Cl.

*G01N 1/06* (2006.01)
*G21K 1/06* (2006.01)
*G21K 1/02* (2006.01)

(52) U.S. Cl.

CPC .. *G21K 1/06* (2013.01); *G21K 1/02* (2013.01); *G21K 2207/005* (2013.01); *H01J 2235/068* (2013.01)

(58) Field of Classification Search

CPC ........................................................ A61B 6/484
See application file for complete search history.

(56) References Cited

U.S. PATENT DOCUMENTS

| | | | | |
|---|---|---|---|---|
| 7,433,444 | B2 | 10/2008 | Baumann et al. | |
| 7,440,542 | B2 | 10/2008 | Baumann et al. | |
| 7,889,838 | B2 | 2/2011 | David et al. | |
| 7,924,975 | B2 | 4/2011 | Zhang et al. | |
| 8,041,004 | B2 | 10/2011 | David et al. | |
| 8,576,983 | B2 | 11/2013 | Baeumer et al. | |
| 2006/0039532 | A1 | 2/2006 | Wu et al. | |
| 2007/0183563 | A1 | 8/2007 | Baumann et al. | |
| 2009/0262891 | A1 | 10/2009 | Zhang et al. | |
| 2010/0260315 | A1* | 10/2010 | Sato et al. | 378/36 |

(Continued)

FOREIGN PATENT DOCUMENTS

| | | | |
|---|---|---|---|
| CN | 101011257 | A | 8/2007 |
| CN | 101561405 | A | 10/2009 |

(Continued)

OTHER PUBLICATIONS

Franz Pfeiffer et al., "Phase Retrieval and Differential Phase-Contrast Imaging with Low-Brilliance X-Ray Sources", Nature Physics, Apr. 2006, pp. 258-261, vol. 2.

(Continued)

*Primary Examiner* — Hoon Song

(74) *Attorney, Agent, or Firm* — Lempia Summerfield Katz LLC

(57) ABSTRACT

An arrangement for inverse x-ray phase contrast imaging includes a photon-counting x-ray detector and a multibeam x-ray tube. Focal points of the x-ray tube are collimated such that a narrow x-ray beam that is directed toward an optical axis of the arrangement and toward the x-ray detector may be generated. An active surface of the x-ray detector is at least as large as a cross-sectional surface of the narrow x-ray beam. The arrangement also includes a source grating arranged between the x-ray tube and the x-ray detector. The arrangement includes a defraction grating arranged between the source grating and the x-ray detector, and an absorption grating arranged between the defraction grating and the x-ray detector.

20 Claims, 2 Drawing Sheets

(56) References Cited

U.S. PATENT DOCUMENTS

| | | | | |
|---|---|---|---|---|
| 2010/0322380 | A1* | 12/2010 | Baeumer et al. | 378/62 |
| 2011/0261924 | A1 | 10/2011 | Bredno | |
| 2012/0307970 | A1* | 12/2012 | Sommerer et al. | 378/62 |
| 2013/0094625 | A1 | 4/2013 | Huang et al. | |

FOREIGN PATENT DOCUMENTS

| | | | |
|---|---|---|---|
| CN | 101952900 | A | 1/2011 |
| CN | 102221565 | A | 10/2011 |
| DE | 102009018137 | | 10/2009 |
| DE | 102010011661 | | 9/2011 |
| EP | 1731099 | | 12/2006 |
| EP | 1803398 | | 7/2007 |
| EP | 1879020 | | 1/2008 |

OTHER PUBLICATIONS

German Office Action dated Apr. 5, 2013 for corresponding German Patent Application No. DE 10 2012 213 876.5 with English translation.

Tilman Donath et al., "Inverse Geometry for Grating-Based X-Ray Phase-Contrast Imaging", Journal of Applied Physics 106, 054703, 2009, 8 pages.

Chinese Office Action for Chinese Application No. 2013103303317, dated Jul. 31, 2015, with English Translation.

* cited by examiner

ARRANGEMENT AND METHOD FOR INVERSE X-RAY PHASE CONTRAST IMAGING

This application claims the benefit of DE 10 2012 213 876.5, filed on Aug. 6, 2012, which is hereby incorporated by reference.

FIELD

The present embodiments relate to an arrangement and a method for inverse x-ray phase contrast imaging with a multi-beam x-ray tube and a photon-counting x-ray detector.

BACKGROUND

X-ray phase contrast imaging is an x-ray method that, unlike conventional x-ray devices, exclusively uses the absorption by an object as an information source. X-ray phase contrast imaging combines the absorption with the shift in phase of the x-rays when passing through the object. The information content is disproportionately higher, since the absorption provides accurate images of the significantly absorbing bones, and the phase contrast also produces sharp images of the structures of the soft tissue. This provides the possibility of being able to identify pathological changes, such as the appearance of tumors, vascular restrictions or pathological changes to the cartilage substantially earlier than before.

The passage of x-rays through matter is described by a complex refraction index. The imaginary part of the refraction index specifies the strength of the absorption. By contrast, the real part of the refraction index specifies the phase shift in the x-ray wave passing through a material. In phase contrast imaging, the phase information of the local phase or of the local gradient of the phase of the wavefront passing through an object are determined. Similar to x-ray tomography, tomographic representations of the phase shift may also be reconstructed on the basis of a plurality of images.

A number of possibilities exist in order to realize x-ray phase contrast imaging. The known solutions involve rendering the phase shift in the x-rays during passage through an object visible as an intensity fluctuation using special arrangements and methods. A method is grating-based phase contrast imaging (e.g., Talbot-Lau interferometry), such as is described many times in literature (e.g., in the European patent application EP 1 879 020 A1). Aspects of the Talbot-Lau interferometer are three x-ray gratings that are arranged between an x-ray tube and an x-ray detector.

In addition to the classical absorption image, interferometers of this type may present two additional measurement parameters in the form of further images: the phase contrast image and the darkfield image. The phase of the x-ray wave is determined in this process by interference with a reference wave using the interferometric grating arrangement.

EP 1 879 020 A1 discloses an arrangement according to FIG. 1 having an x-ray tube 1 and a pixelated x-ray detector 2, between which an object 3 to be irradiated is arranged. A source grating G0 (e.g., coherence grating) is arranged between the focal point of the x-ray tube 1 and the object 3. The source grating G0 is used to simulate a number of line sources with spatial partial coherence of the x-rays, thereby forming a precondition for interferometric imaging.

A defraction grating G1, also known as phase grating or Talbot grating, is arranged between the object 3 and the x-ray detector 2. The defraction grating G1 impresses a phase shift by Pi on the phase of the wavefront.

An absorption grating G2 between the defraction grating G1 and the x-ray detector 2 is used to measure the phase shift generated by the object 3. The wavefront upstream of the object 3 is designated W0. The wavefront "distorted" by the object 3 is designated W1. The gratings G0, G1 and G2 must be arranged in parallel and at precise distances from one another.

The x-ray detector 2 is used as locally-dependent proof of x-ray quanta. Since the pixelization of the x-ray detector 2 is generally not sufficient to resolve the interference strips of the Talbot pattern, the intensity pattern is scanned by shifting one of the gratings G0, G1, G2 ("phase-stepping"). The scanning takes place gradually or continuously at right angles to the direction of the x-ray and at right angles to the slot direction of the absorption grating G2. Three different types of x-ray images are recorded and/or reconstructed: the absorption image, the phase contrast image and the darkfield image.

The geometric ratios of the grating arrangement according to EP 1 879 020 A1 are shown schematically in FIG. 2. The gratings G0, G1 and G2 are arranged between the x-ray tube 1 and the planar x-ray detector 2. The source grating G0 has the smallest surface, since it is positioned close to the x-ray tube 1. The absorption grating G2 has the largest surface, since it is positioned directly upstream of the x-ray detector 2.

SUMMARY AND DESCRIPTION

The scope of the present invention is defined solely by the appended claims and is not affected to any degree by the statements within this summary. The present embodiments may obviate one or more of the drawbacks or limitations in the related art. For example, a further arrangement and an associated method for x-ray phase contrast imaging are provided.

In contrast to known x-ray phase contrast imagings, an extended multifocus x-ray source is used instead of an individual x-ray source. Rays of the multifocus x-ray source are collimated on a relatively small photon-counting x-ray detector. As a result, proportions of the gratings in the radiation path may be reversed. A source grating is as large as the x-ray source. A defraction grating is smaller, and an absorption grating is as large as the active detector surface. Multifocus x-ray tubes (e.g., multibeam x-ray tubes) are described by way of example in the patent application DE 10 2010 011 661 A1.

In one embodiment, an arrangement for inverse x-ray phase contrast imaging includes a photon-counting x-ray detector and a multibeam x-ray tube. Focal points of the multibeam x-ray tube are collimated such that a narrow x-ray that is directed toward an optical axis of the arrangement and toward the x-ray detector may be generated in each instance. The active surface of the x-ray detector is at least as large as the cross-sectional surface of the narrow x-ray beam. The arrangement further includes a source grating arranged between the x-ray tube and the x-ray detector. The dimensions of the source grating are such that the source grating may be irradiated by all narrow x-rays of the multibeam x-ray tube. A defraction grating is arranged between the source grating and the x-ray detector. The dimensions of the defraction grating are such that the defraction grating be irradiated by all narrow x-rays that penetrate the source grating. An absorption grating is arranged between the defraction grating and the x-ray detector. The dimensions of the absorption grating are such that the absorption grating is irradiated by all narrow x-rays that penetrate the defraction grating.

One or more of the present embodiments are advantageous in that the technically demanding absorption grating has the smallest grating surface. With the conventional arrangement, the absorption grating has the largest surface. In accordance with the prior art, large gratings, which are used for the conventional geometry (e.g., extended detector with a used image field), may not be manufactured or may only be manufactured with a significant technical outlay. The source grating has the largest surface but is, however, technically easier to produce on account of the large grating periods. Source gratings and collimators may also be combined.

In a further development, the irradiated surface of the absorption grating may be larger than or equal to the photon-receiving active surface of the x-ray detector.

In a further embodiment, the irradiateable surface of the absorption grating may be smaller than the irradiateable surface of the defraction grating, and the irradiateable surface of the defraction grating may be smaller than the irradiateable surface of the source grating.

In a further embodiment, the source grating, the defraction grating and the absorption grating may be arranged in parallel to one another and at right angles to the optical axis of the arrangement.

The width and the length of the active surface of the x-ray detector may, for example, be larger than 1 cm and smaller than 10 cm.

The focal points may be actuated sequentially. As a result, the "phase-stepping" is omitted (e.g., no movement of the absorption grating is required). As a result, a fixed attachment of the absorption grating may be provided, and no mechanism for shifting is required. The phase shift may be determined more accurately, since no uncertainties occur in the positioning caused by mechanical shifting.

A method for inverse x-ray phase contrast imaging includes generating a number of narrow x-rays with a multibeam x-ray tube. Focal points of the x-ray tube are collimated such that the narrow x-rays are directed at the optical axis of the arrangement and at a photon-counting x-ray detector. The method includes irradiating a source grating arranged between the x-ray tube and the x-ray detector, irradiating a defraction grating arranged between the source grating and the x-ray detector, and, irradiating an absorption grating arranged between the defraction grating and the x-ray detector.

In a further development of the method, the focal points may be actuated sequentially.

DETAILED DESCRIPTION

Figure 1:
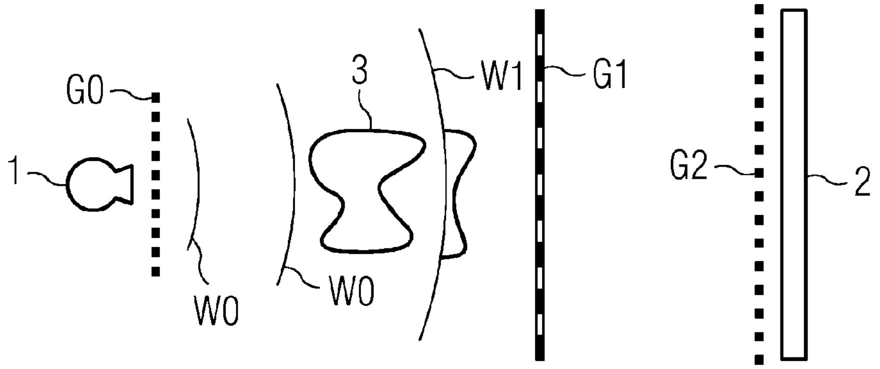
FIG 1 Prior art
FIG. 1 shows an arrangement for x-ray phase contrast imaging according to the prior art.
Figure 2:
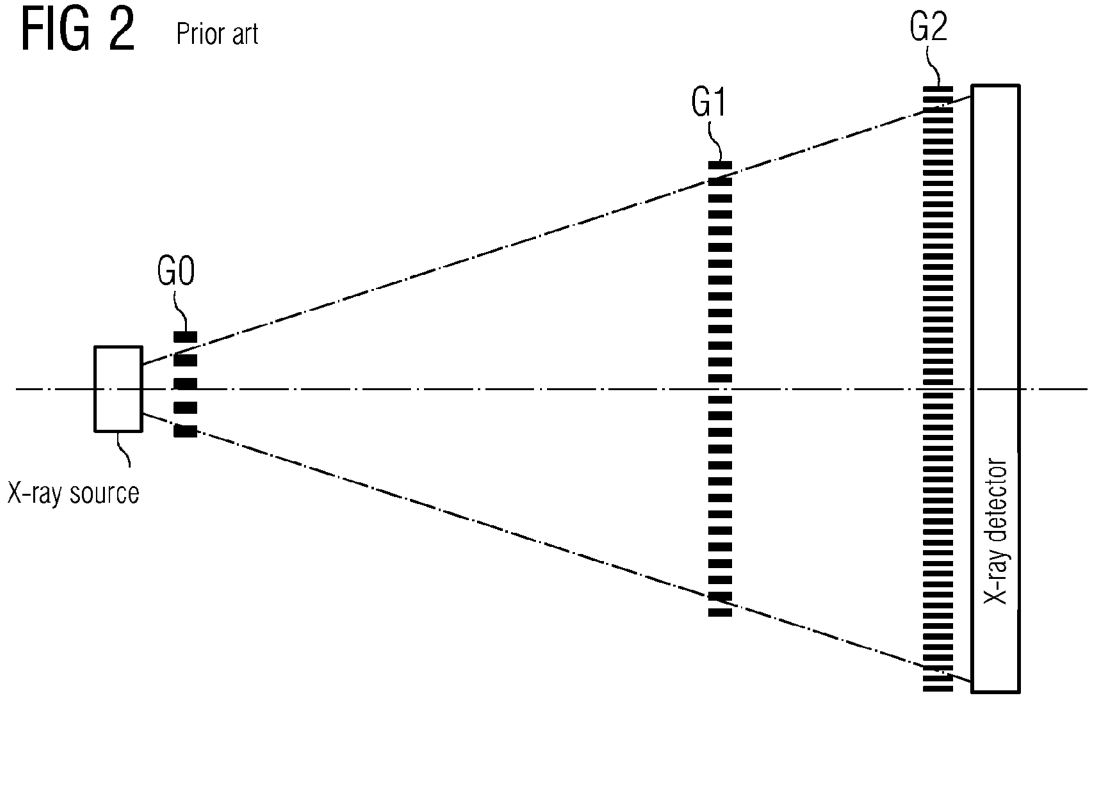
FIG 2 Prior art
FIG. 2 shows a representation of geometric ratios of an arrangement for x-ray phase contrast imaging according to the prior art.
Figure 3:
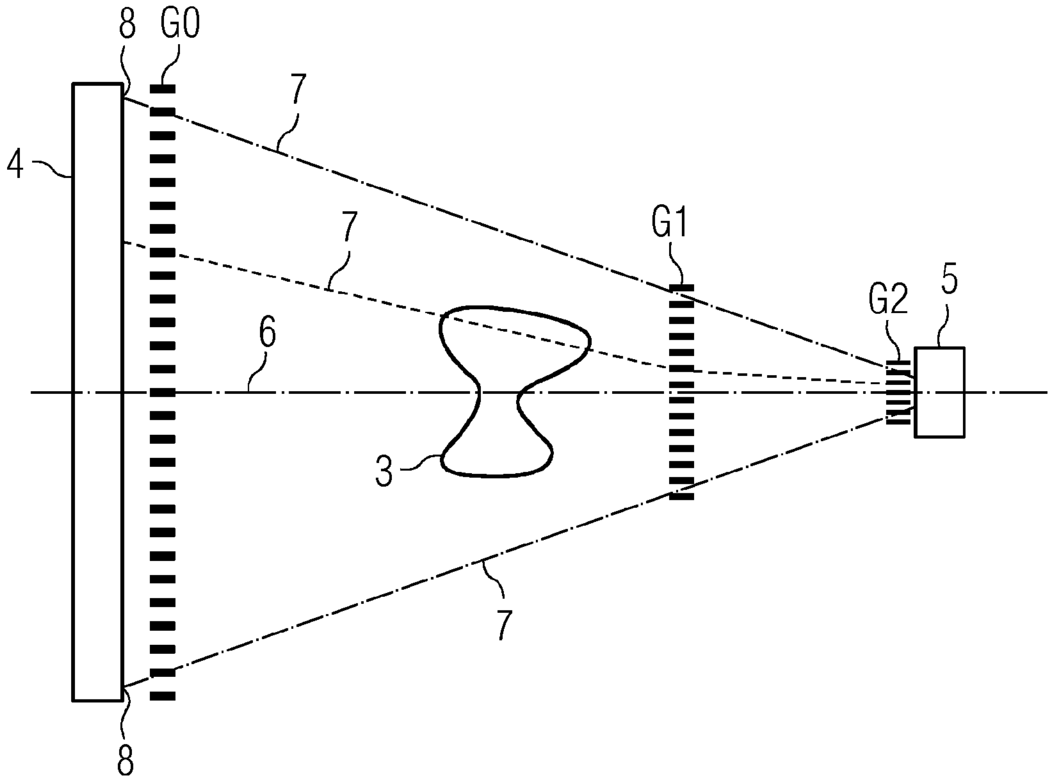
FIG. 3 shows a representation of exemplary geometric ratios of one embodiment an arrangement for inverse x-ray phase contrast imaging.

FIG. 3 shows one embodiment of an arrangement with a multibeam x-ray tube 4 including a plurality of focal points 8. Each focal point 8 is collimated by a narrow x-ray beam 7 that is directed at an x-ray detector 5 with a small, active surface. The focal points 8 of the x-ray tube 4 may be actuated individually, in a defined sequence or sequentially. With an arrangement for inverse x-ray imaging, an extended multibeam x-ray tube 4 is used, whereas the x-ray detector 5 only has a small active surface. The focal points 8 are arranged in a 2-dimensional manner and/or in rows.

The x-ray detector 5 counts photons and has a very quick read-out rate, since the x-ray detector 5 is to be read out for each active focal point 8 immediately after exposure and/or irradiation. Photon-counting x-ray detectors 5 advantageously have an improved quanta efficient compared with integrating detectors.

The narrow x-rays 7 are collimated in the direction of the optical axis 6 of the arrangement. On the way, the x-rays 7 firstly penetrate a source grating G0 that simulates a number of line sources with spatial partial coherence of the x-rays. After irradiating an object 3, the x-ray 7 penetrates a defraction grating G1 and then an absorption grating G2, before the x-ray 7 strikes the x-ray detector 5.

With an inverse arrangement of this type, the source grating G0 has the largest surface. The source grating G0 may have the largest period length and thus may have the smallest technical outlay. The source grating G0 may be integrated in a collimator (not shown).

The technically most complicated grating with the smallest period length and the largest aspect ratio is the absorption grating G2. With inverse geometry, the absorption grating G2 has the smallest surface and is therefore easier and more cost-effective to manufacture. The defraction grating G1 is arranged downstream of the object 3 and upstream of the absorption grating G2 and is smaller than the source grating G0.

The distances between the used gratings G0, G1, G2 in the direction of an optical axis may be determined, for example, with the aid of the published publication T. Donath et al., "Inverse geometry for grating-based x-ray phase-contrast imaging," J. Appl. phys. 106, 054703 (2009)." The size of the multibeam x-ray tube 4 conforms with the size of the object 3 to be examined. The size of the x-ray detector 5 is dependent on the size of the collimated x-ray 7, the required read-out rate, and the radiation intensity of the individual focal points 8. Dimensions of, for example, 1 to 10 cm may be used. The active surface of the x-ray detector 5 does not have to be square.

A sequential actuation of the individual focal points 8 allows for the "phase-stepping" of the conventional x-ray phase contrast imaging to be omitted. The intensity pattern and/or the phase shift generated by the object 3 may be reconstructed with the inverse phase contrast imaging directly via the detector response.

The inverse geometry for imaging is also advantageous in that the average skin dose on the radiation entry side may be reduced by a larger surface on the entry side. A lower scatter radiation in the detector allows for the radiation dose to be reduced. In addition, a digital tomosynthesis using reconstruction methods enables additional layer representations of the object.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An arrangement for inverse x-ray phase contrast imaging, the arrangement comprising:

a photon-counting x-ray detector;

a multibeam x-ray tube, focal points of the multibeam x-ray tube being collimated such that a narrow x-ray beam that is directed toward an optical axis of the arrangement and toward the photon-counting x-ray detector is generatable, wherein an active surface of the photon-counting x-ray detector is at least as large as a cross-sectional surface of the narrow x-ray beam;

a source grating arranged between the multibeam x-ray tube and the photon-counting x-ray detector, dimensions of the source grating being such that the source grating is irradiatable by all narrow x-rays of the multibeam x-ray tube;

a defraction grating arranged between the source grating and the photon-counting x-ray detector, dimensions of the defraction grating being such that the defraction grating is irradiatable by all narrow x-rays that penetrate the source grating; and an absorption grating arranged between the defraction grating and the multibeam x-ray detector, dimensions of the absorption grating being such that the absorption grating is irradiatable by all narrow x-rays that penetrate the defraction grating, wherein an irradiatable surface of the absorption grating is smaller than an irradiatable surface of the defraction grating.

2. The arrangement as claimed in claim 1, wherein the irradiatable surface of the absorption grating is larger than or equal to a photon-receiving active surface of the photon-counting x-ray detector.

3. The arrangement as claimed in claim 2, wherein the irradiatable surface of the defraction grating is smaller than an irradiatable surface of the source grating.

4. The arrangement as claimed in claim 1, wherein the source grating, the defraction grating, and the absorption grating are arranged in parallel to one another and at right angles to the optical axis.

5. The arrangement as claimed in claim 1, wherein a width and a length of the active surface of the photon-counting x-ray detector are greater than 1 cm and less than 10 cm.

6. The arrangement as claimed in claim 1, wherein the focal points are actuatable sequentially.

7. The arrangement as claimed in claim 1, wherein the irradiatable surface of the defraction grating is smaller than an irradiatable surface of the source grating.

8. The arrangement as claimed in claim 2, wherein the source grating, the defraction grating, and the absorption grating are arranged in parallel to one another and at right angles to the optical axis.

9. The arrangement as claimed in claim 3, wherein the source grating, the defraction grating, and the absorption grating are arranged in parallel to one another and at right angles to the optical axis.

10. The arrangement as claimed in claim 2, wherein a width and a length of the active surface of the photon-counting x-ray detector are greater than 1 cm and less than 10 cm.

11. The arrangement as claimed in claim 3, wherein a width and a length of the active surface of the photon-counting x-ray detector are greater than 1 cm and less than 10 cm.

12. The arrangement as claimed in claim 4, wherein a width and a length of the active surface of the photon-counting x-ray detector are greater than 1 cm and less than 10 cm.

13. The arrangement as claimed in claim 2, wherein the focal points are actuatable sequentially.

14. The arrangement as claimed in claim 3, wherein the focal points are actuatable sequentially.

15. The arrangement as claimed in claim 4, wherein the focal points are actuatable sequentially.

16. The arrangement as claimed in claim 5, wherein the focal points are actuatable sequentially.

17. A method for inverse x-ray phase contrast imaging, the method comprising:

generating narrow x-rays with a multibeam x-ray tube, focal points of the multibeam x-ray tube being collimated such that the narrow x-rays are directed at an optical axis of the multibeam x-ray tube and at a photon-counting x-ray detector;

irradiating a source grating arranged between the multibeam x-ray tube and the photon-counting x-ray detector;

irradiating a defraction grating arranged between the source grating and the photon-counting x-ray detector; and irradiating an absorption grating arranged between the defraction grating and the photon-counting x-ray detector, wherein an irradiatable surface of the absorption grating is smaller than an irradiatable surface of the defraction grating.

18. The method as claimed in claim 17, further comprising sequentially actuating the focal points.

19. The method as claimed in claim 17, further comprising using an arrangement, the using of the arrangement comprising the generating, the irradiating of the source grating, the irradiating of the defraction grating, and the irradiating of the absorption grating, the arrangement comprising:

the photon-counting x-ray detector;

the multibeam x-ray tube, wherein an active surface of the photon-counting x-ray detector is at least as large as a cross-sectional surface of the narrow x-ray beam;

the source grating arranged between the multibeam x-ray tube and the photon-counting x-ray detector, dimensions of the source grating being such that the source grating is irradiatable by all narrow x-rays of the multibeam x-ray tube;

the defraction grating arranged between the source grating and the photon-counting x-ray detector, dimensions of the defraction grating being such that the defraction grating is irradiatable by all narrow x-rays that penetrate the source grating; and the absorption grating arranged between the defraction grating and the multibeam x-ray detector, dimensions of the absorption grating being such that the absorption grating is irradiatable by all narrow x-rays that penetrate the defraction grating.

20. The method as claimed in claim 18, further comprising using an arrangement, the using of the arrangement comprising the generating, the irradiating of the source grating, the irradiating of the defraction grating, and the irradiating of the absorption grating, the arrangement comprising:

the photon-counting x-ray detector;

the multibeam x-ray tube, wherein an active surface of the photon-counting x-ray detector is at least as large as a cross-sectional surface of the narrow x-ray beam;

the source grating arranged between the multibeam x-ray tube and the photon-counting x-ray detector, dimensions of the source grating being such that the source grating is irradiatable by all narrow x-rays of the multibeam x-ray tube;

the defraction grating arranged between the source grating and the photon-counting x-ray detector, dimensions of the defraction grating being such that the defraction grating is irradiatable by all narrow x-rays that penetrate the source grating; and the absorption grating arranged between the defraction grating and the multibeam x-ray detector, dimensions of the absorption grating being such that the absorption grating is irradiatable by all narrow x-rays that penetrate the defraction grating.

* * * * *